No. 664,568. Patented Dec. 25, 1900.
R. E. MONGER.
VENDING MACHINE.
(Application filed Feb. 6, 1900.)

(No Model.) 4 Sheets—Sheet 1.

Witnesses: Geo. E. Frech, B. E. Seitz.

Inventor: Robert E. Monger, by A. S. Pattison, Attorney.

THE NORRIS PETERS CO., PHOTO-LITHO., WASHINGTON, D. C.

No. 664,568. Patented Dec. 25, 1900.
R. E. MONGER.
VENDING MACHINE.
(Application filed Feb. 6, 1900.)
(No Model.) 4 Sheets—Sheet 2.

Witnesses
Geo. E. Fuch
B. E. Seitz

Inventor
Robert E. Monger
by A. S. Pattison,
Attorney

No. 664,568. Patented Dec. 25, 1900.
R. E. MONGER.
VENDING MACHINE.
(Application filed Feb. 6, 1900.)

(No Model.) 4 Sheets—Sheet 3.

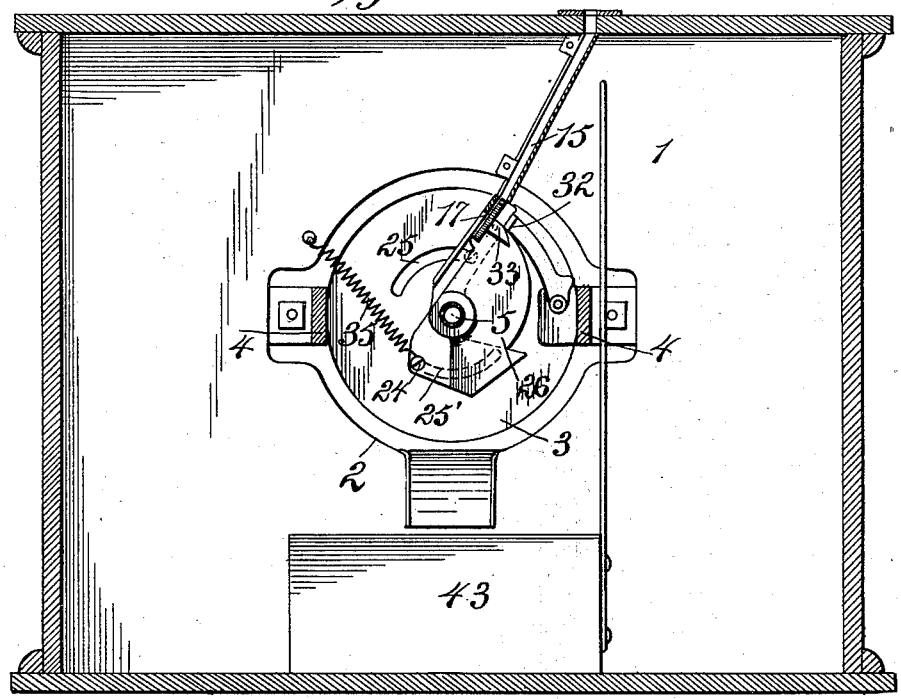

UNITED STATES PATENT OFFICE.

ROBERT E. MONGER, OF MORRISTOWN, INDIANA, ASSIGNOR OF ONE-HALF TO MILTON K. BANKERT, OF SAME PLACE.

VENDING-MACHINE.

SPECIFICATION forming part of Letters Patent No. 664,568, dated December 25, 1900.

Application filed February 6, 1900. Serial No. 4,251. (No model.)

*To all whom it may concern:*

Be it known that I, ROBERT E. MONGER, a citizen of the United States, residing at Morristown, in the county of Shelby and State of Indiana, have invented new and useful Improvements in Measuring Apparatus, of which the following is a specification.

This invention relates to improvements in measuring apparatus, and pertains to a machine which is adapted to deliver to the operator a predetermined quantity of liquid at each operation of an operating-handle, all of which will be fully described hereinafter, and particularly pointed out in the claims.

The object of my invention is to provide a measuring-machine which will measure a predetermined quantity of liquid and through the intervention of an operating-handle deliver the measured quantity of liquid to the operator, and to provide a make-and-break mechanism between the operating-handle and the measuring mechanism, the said make-and-break mechanism being so constructed that the measuring-receptacle is automatically held in an emptying position independent of the operating-handle and is automatically released and permitted to return to its filling position when the operating-handle is returned to its normal position.

Figure 1:
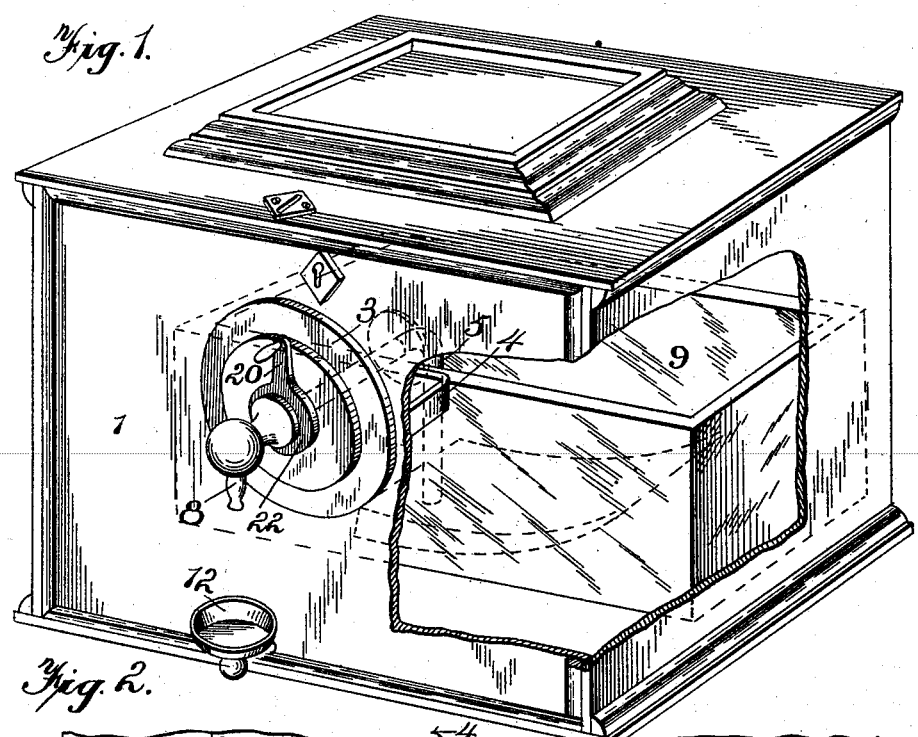
Figure 2:
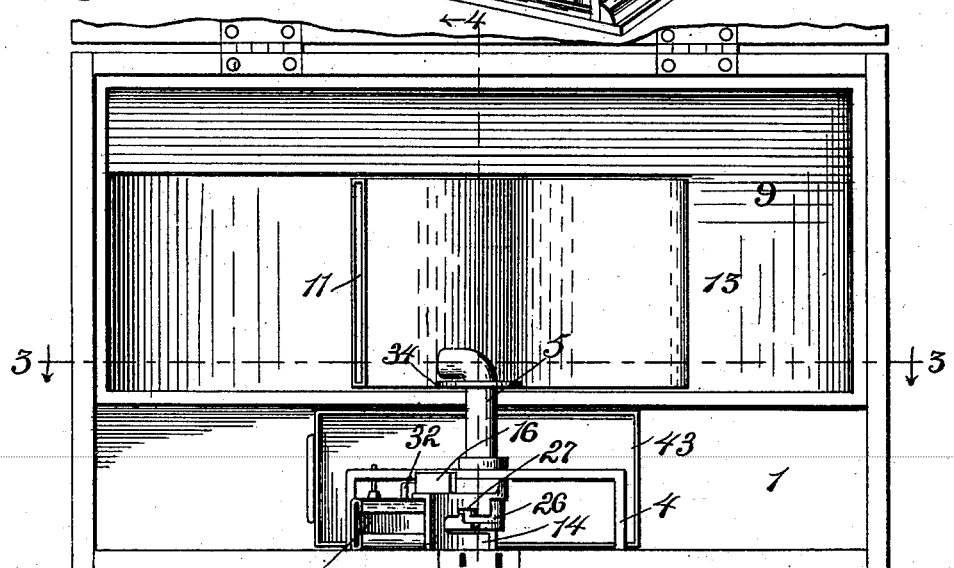
Figure 3:
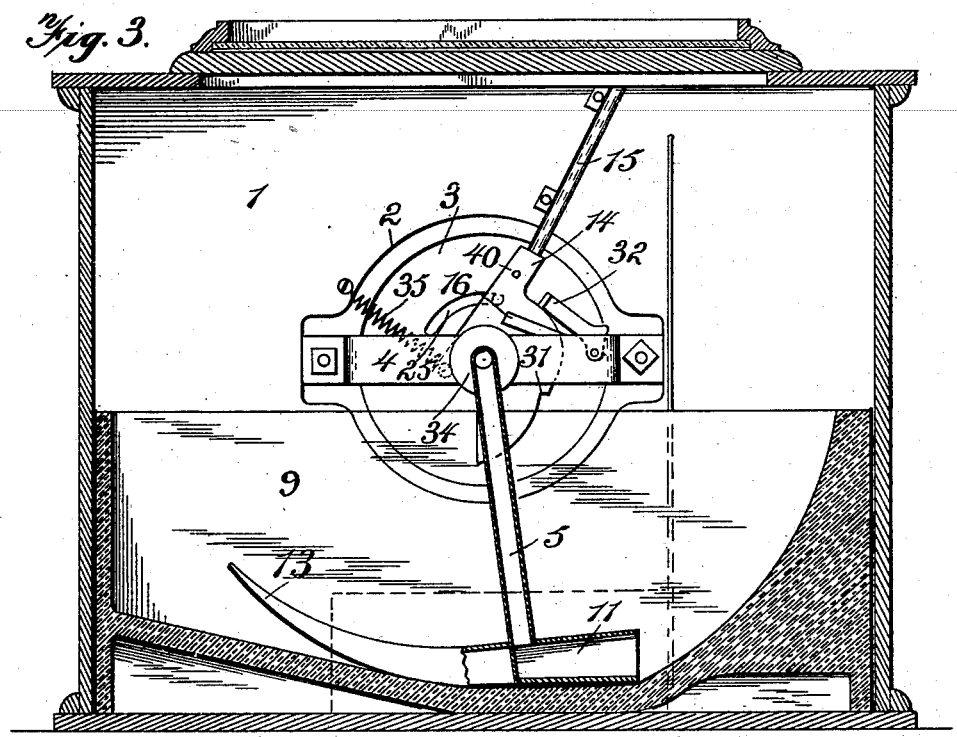
Figure 4:
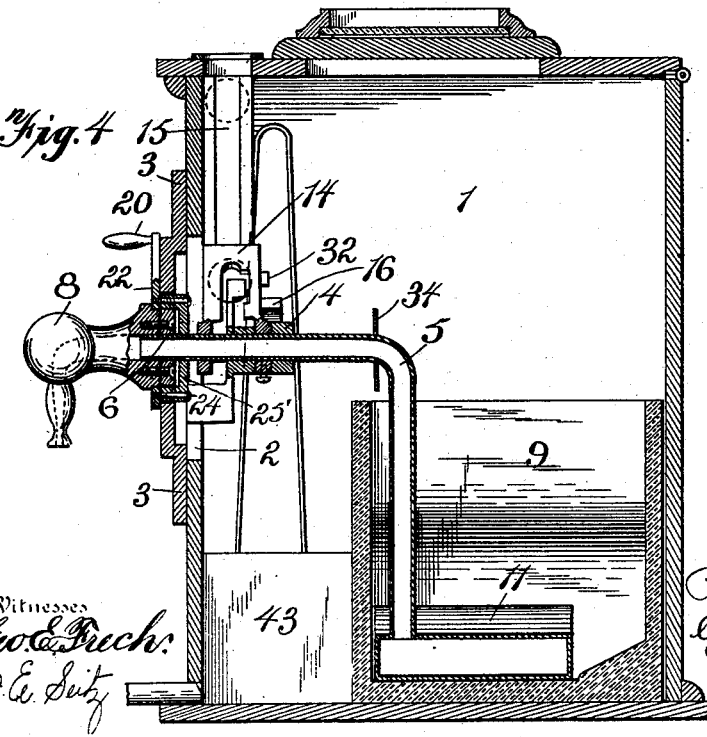
Figure 5:
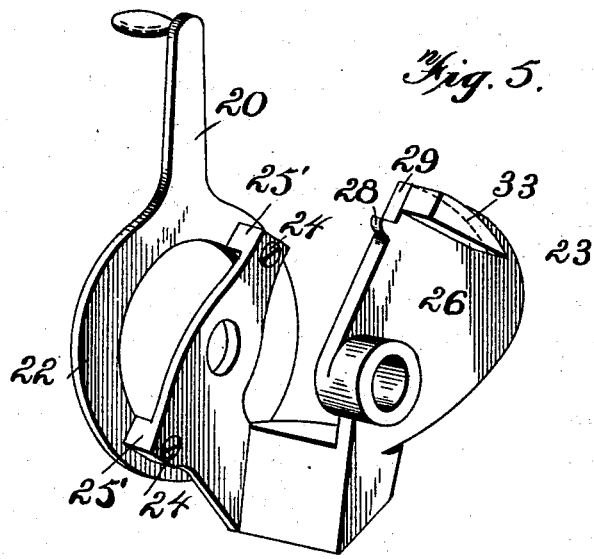
Figure 6:
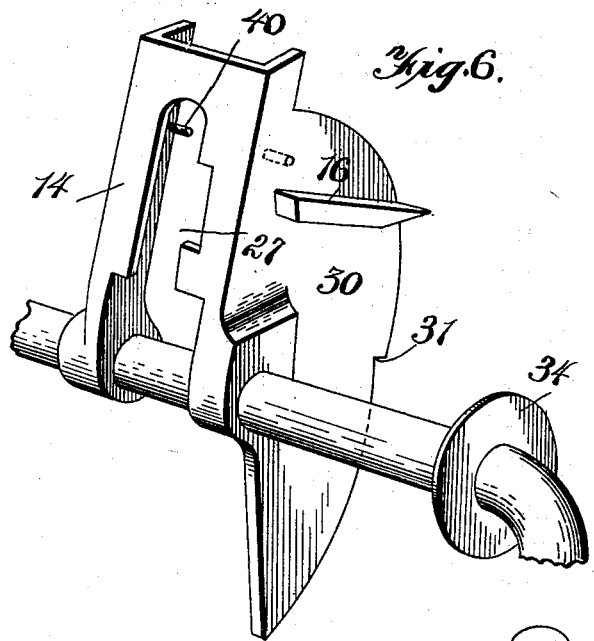

In the accompanying drawings, Figure 1 is a perspective view of a machine embodying my invention, the case of the machine being partly broken away to exhibit the internal construction thereof. Fig. 2 is a top plan view of the apparatus, the top of the case being removed. Fig. 3 is a vertical sectional view on the line 3 3 of Fig. 2 looking in the direction indicated by arrow and showing a side elevation of the operating mechanism. Fig. 4 is a vertical section on the line 4 4 of Fig. 2 and taken at right angles to Fig. 3. Fig. 5 is a detached view of the coin-receiving member, which is connected with the operating lever or handle. Fig. 6 is a detached view of the coin-engaging member, which is attached to the liquid-delivering pipe. Fig. 7 is a vertical sectional view taken transverse the liquid-delivering pipe and through the coin-delivery slot, the coin being shown in operative position therein for making connection between the operating-handle and liquid-delivering mechanism.

I here show and hereinafter describe a make-and-break mechanism between the operating-handle and the liquid-delivering mechanism of the coin-controlled type. However, I do not make any claim in this application for the construction of the coin-controlled mechanism, as this forms the subject-matter of a separate application, and for the further reason that other forms of make-and-break mechanisms between the operating-handle and the measuring mechanism may be used without in any manner affecting my measuring apparatus.

Referring now to the drawings, 1 indicates a case or box, which is here shown as rectangular in form, but which may be of any other desired contour without in any manner affecting my invention. This box 1 has one of its walls provided with an opening 2, in which is supported a member or casting 3 for supporting the operating mechanism. This member or casting may be provided with inwardly-projecting bolts adapted to pass through registering openings in the wall of the case or box, or screws may be passed through the casting into the box, as will be readily understood, for the purpose of attaching the casting to the box. This supporting member or casting is provided with an inwardly-extending horizontal U-shaped supporting-frame 4, which, together with the casting-supporting member or plate, serves to support a shaft or hollow pipe 5. This hollow shaft or pipe 5 passes through the said U-shaped frame 4 and loosely through a central opening 6, formed in the said supporting plate or casting, and has its outer end projecting into a stationary inverted-L-shaped faucet or exit member 8.

Situated within the case or box 1 is a liquid-receptacle 9, the said liquid-receptacle being preferably composed of glass and having a curved bottom 10, formed on the arc of a circle concentric with the axis of the hollow shaft or pipe 5. This hollow shaft or pipe 5 may be aptly termed a "liquid-delivering pipe" and has its inner end bent downward into the said liquid-receptacle 9. Attached to this depending end of the hollow shaft or pipe is a measuring vessel or dipper 11, the said measuring vessel or dipper being preferably horizontally elongated and with its forward end open, whereby it is adapted to be normally filled with the liquid in the liquid-receptacle when the dipper is in its normal position therein. The hollow shaft or pipe 5 has its lower end in communication with the bottom of this dipper 11, whereby when the shaft is rotated to carry the dipper in a vertical position the liquid contained therein will pass through the hollow shaft and into the said faucet 8 and from the faucet 8 into a glass or other receptacle held under the said faucet. For convenience a bracket 12 projects from the case and is located under the exit end of the faucet and adapted to support a glass or other receptacle to receive the measured liquid as it passes from the machine. For the purpose of preventing a splashing of the liquid when the dipper or measuring receptacle falls to its original position when released, in a manner to be described hereinafter, the rear end or bottom of the dipper is provided with a curved rearwardly-extending and pointed portion 13, which will prevent a splashing of the liquid, and when made hollow serves also to cause an upward pull or floating tendency upon the said hollow shaft and tends to turn the same in a direction to hold it in its proper normal position, as will more fully appear farther on.

Rigidly secured to the hollow shaft between the U-shaped frame 4 and the supporting-plate is a U-shaped coin-engaging member 14, and secured to the inner side of the case is a coin way or trough 15, which will be of a size adapted to receive the denomination of coin which it is desired to use in the machine and will not receive coins of other denominations, as is well understood by those skilled in the art. For the purpose of limiting the rotation of the hollow shaft in the direction of its normal position under the weight and floating tendency of the dipper or measuring receptacle carried by its lower end the said coin-engaging member 14 is provided with a laterally-projecting lug 16, adapted to rest upon the adjacent portion of the U-shaped frame 4. When this lug is in engagement with the said frame, the coin-engaging member 14 is in the proper position to receive the coin 17, as illustrated in Fig. 7.

The operating mechanism consists of a handle 20, which is secured to a ring 22, the said ring 22 being journaled upon the inner end of the faucet 8 or an outwardly-extending sleeve formed upon the supporting-plate, and this ring is connected with a coin-receiving member 23. The connection between the coin-receiving member 23 and the said operating ring and handle is through the medium of screws 24, which pass through concentric slots 25, formed in the supporting-plate, and which are screwed into arms 25', which are at the outer end of the coin-receiving member. This coin-receiving member is loosely journaled upon the hollow shaft and is provided with an upwardly-projecting arm 26, which is adapted to move through the opening or space 27 formed between the arms of the U-shaped coin-engaging member 14, which is rigidly secured to the hollow pipe or shaft. This coin-receiving member is provided with a projecting lug 28 just below its upper edge, the said lug constituting an L-shaped recess 29, adapted to receive the coin when it is dropped through the coin-trough and to hold the coin between the said coin-receiving member and the coin-engaging member 14, as shown in Fig. 7.

The coin-engaging member is provided with a flange 30, the said flange provided with one or more notches 31, with which a pawl 32 is adapted to engage when the hollow shaft is rotated, and the dipper or measuring-receptacle carried in a vertical position for emptying its contents, and when in this position the pawl serves to hold the hollow shaft, and consequently the dipper, in the said position until the pawl is tripped from engagement therewith. The coin-engaging member connected with the operating-handle, as before described, is provided with a cam 33, which is adapted to engage the said pawl, as illustrated, and to normally hold it out of engagement with the notched flange of the coin-engaging member 14, and when the operating-handle is turned back to its normal position it will trip the pawl, and thereby permit the measuring vessel or dipper to fall into the liquid-tank 9 and assume its normal position, where it is filled with the liquid contained in the receptacle ready to be again operated when the proper coin is dropped in the machine.

I here show a spring 35, having one end connected with the operating-handle, whereby the operating-handle and the coin-receiving member are returned to their normal position, though this spring is not absolutely necessary, since the shape and construction of the device itself would carry it to its normal position by its own gravity. Through the medium of a spring, however, this is made more positive, so that as soon as the handle is released the coin-receiving member is immediately carried to its normal position.

In the operation of the device a coin is dropped through the slot formed in the top of the case and into the coinway. The coin then falls upon the coin-receiving member and rests in the L-shaped recess 29 and between it and the coin-engaging member 14, carried by the hollow shaft. In this position when the operating-handle is turned the coin serves to force or carry the coin-engaging member 14 with it and consequently to rotate the hollow shaft, which carries the measuring vessel or dipper to a vertical and emptying position, when the contents thereof will pass by gravity through the hollow shaft and through the faucet to the receptacle placed thereunder. The operating-handle is held in this position until the liquid ceases to pass through the faucet, which indicates to the operator that the machine has delivered the measured quantity of liquid. While the dipper is in its emptying position, the pawl 32 has engaged one of the notches upon the flange of the hollow-shaft coin-engaging member and serves to support the vessel in that position, so that the operator will not need to support the weight of the dipper and its contents, but simply to hold the operating-handle from moving to its original position. As soon as the operating-handle moves backward to its original position it moves from under the coin 50, and the coin-stripping projections 40, projecting inward from opposite sides of the coin-engaging member 14, serve to strip the coin from the coin-engaging member, when the coin will fall downward and be guided by the inwardly-projecting lip 41 into a coin-receptacle 42, placed within the case at one side of the liquid-receptacle 9. For the purpose of facilitating the removing of the coins from the machine the coin-receptacle 43 is provided with an upwardly-projecting handle, by means of which it can be readily withdrawn and inserted into position.

It will be readily understood that the top of the case is provided with a lock for locking it, whereby access cannot be had to the interior of the machine, except by the owner or his agent, for the purpose of taking therefrom the coins in the coin-receptacle.

It will be noted from the above description that the spring for returning the handle to its normal position is not absolutely essential to the operation of the invention, as any equivalent construction may be substituted therefor.

It will be noted that the pawl for engaging and supporting the measuring receptacle or dipper in its emptying position serves a double function—first, in supporting the receptacle in its emptying position independent of the operator, and, secondly, in holding the coin-engaging member carried by the hollow shaft against returning to its normal position until the coin-receiving member has moved away therefrom and the coin been removed or stripped from the coin-receiving member and permitted to fall away from the operating mechanism. If this pawl or its equivalent were not provided, then the operator could continue to operate the machine as often as desired by continually filling and emptying the dipper, since the coin would remain in its operative position for establishing connection between the operating-handle and the liquid-delivering device. When there is no coin in position, it will be readily understood that the operating-handle can be moved as often and as freely as desired without effecting the machine in that the coin-receiving member will freely move between the arms of the U-shaped coin-receiving member 14, carried by the hollow pipe or shaft.

Having thus described my invention, what I claim, and desire to secure by Letters Patent, is—

1. A liquid-delivering machine comprising a liquid-receptacle, an oscillating hollow shaft having one end depending into a liquid-receptacle, a measuring-receptacle attached to the depending end of the hollow shaft and within the liquid-receptacle, an operating-handle and means for operatively connecting said handle with the oscillating shaft, substantially as described.

2. A liquid measuring and delivering apparatus comprising a liquid-containing receptacle, an oscillating pipe having its end depending within the receptacle and carrying a measuring vessel in communication with the pipe, a handle adapted to be operatively connected with the pipe, and a faucet independent of the said pipe but in communication therewith, substantially as described.

3. A liquid measuring and delivering apparatus comprising a liquid-receptacle, an oscillating pipe having one end depending within the receptacle, a measuring vessel carried by the said depending end of the pipe and in communication therewith, a faucet, the opposite end of the pipe extending into the faucet, a handle journaled upon the said pipe, and means for operatively connecting the handle with the oscillating pipe, substantially as described.

4. A liquid measuring and delivering apparatus comprising a liquid-receptacle, an L-shaped pipe having one leg thereof extending within the liquid-receptacle and carrying a measuring vessel which is in communication with the pipe, the opposite end of the pipe in communication with an exit-orifice, a handle movable independent of the exit-orifice, and means for operatively connecting said handle with said pipe, substantially as described.

5. A liquid measuring and delivering apparatus comprising a case having a liquid-receptacle, an essentially L-shaped pipe having its horizontal portion journaled in the case and its vertical portion extending within the liquid-receptacle, the outer end of the horizontal portion of the shaft projecting through the case, the lower vertical end of the pipe provided with a measuring vessel which is in communication with the pipe, a handle, and means for operatively connecting said handle with the pipe, substantially as described.

6. A liquid measuring and delivering apparatus comprising an essentially L-shaped oscillating pipe having a journal for its horizontal portion, a liquid-receptacle, a measuring vessel within the liquid-receptacle carried by the vertical portion of the pipe and in communication therewith, the liquid-receptacle having a curved bottom formed on the arc of a circle with the axis of the horizontal portion of the pipe as its center, a handle, and means for operatively connecting said handle with the pipe, substantially as described.

7. A liquid-delivering machine comprising a case, a liquid-receptacle within the case, an axially-movable hollow shaft having its inner end provided with a measuring-receptacle extending within the liquid-receptacle, an operating-handle situated outside of the case, and means for operatively connecting the said handle with the said hollow shaft, substantially as described.

8. A liquid-delivering machine comprising a casing containing a liquid-receptacle, an axially-movable hollow shaft carrying at its inner end a measuring-receptacle situated within the liquid-receptacle and in communication with the said hollow shaft, an operating-handle situated outside of the case, and means situated within the case for operatively connecting said handle with said hollow shaft, substantially as described.

9. A liquid-delivering machine comprising a liquid-receptacle, an axially-movable hollow shaft, one end of the shaft carrying a measuring-receptacle in communication therewith and movable within the said liquid-receptacle, an operating-handle, and means for operatively connecting the said handle with the said shaft, substantially as described.

10. In a liquid-delivering machine, the combination of a liquid-receptacle, a movable dipper located within the receptacle, and having an outlet communicating with the exterior of the liquid-receptacle, a handle outside of the liquid-receptacle and normally out of operative connection with the receptacle, and means for operatively connecting the handle with the said dipper for carrying the latter to an elevated and emptying position, substantially as described.

11. In a liquid-delivering machine, the combination of a liquid-receptacle, a vertically-movable dipper located within said liquid-receptacle, the dipper having an opening in communication with the outside of the liquid-receptacle, an operating-handle situated outside of the said liquid-receptacle and normally out of the operative connection with said dipper, and means for operatively connecting the said handle with the said dipper for elevating it to its emptying position, substantially as described.

12. A liquid-delivering machine comprising a liquid-receptacle, a case containing the said receptacle, a hollow shaft having an inlet-opening within the case and an outlet-opening communicating with the outside of the case, a movable measuring-receptacle within the liquid-receptacle and in communication with the said hollow shaft, an operating-handle located outside of the case and movable independent of the said measuring-receptacle, and means located within the case for operatively connecting the said handle and the movable liquid-receptacle, substantially as described.

In testimony whereof I have hereunto set my hand in the presence of two subscribing witnesses.

ROBERT E. MONGER.

Witnesses:
W. J. CREMENS,
DAVID A. WILLIAMSON.